(Model.)

A. LEAS.
SCOOP BALANCE ATTACHMENT FOR WEIGHING SCALES.

No. 287,136. Patented Oct. 23, 1883.

WITNESSES:
C. Sedgwick
A. Turcott

INVENTOR:
A. Leas
BY Munn & Co.
ATTORNEYS.

UNITED STATES PATENT OFFICE.

ASA LEAS, OF WEST MANCHESTER, OHIO.

SCOOP-BALANCE ATTACHMENT FOR WEIGHING-SCALES.

SPECIFICATION forming part of Letters Patent No. 287,136, dated October 23, 1883.

Application filed April 14, 1883. (Model.)

*To all whom it may concern:*

Be it known that I, ASA LEAS, of West Manchester, Preble county, Ohio, have invented a new and Improved Scoop-Balance Attachment for Weighing-Scales, of which the following is a full, clear, and exact description.

This improved device for automatically balancing the weight of the scoop so that only the net weight will be weighed by the scale consists of a lever under the platform, whereon the weight of the scoop is balanced by means of a stud projecting from the center of the bottom of the scoop into a hollow space in the upper part of the platform-standard, and bearing on a stud projecting up from the arm of an intermediate lever having a fulcrum on the main lever, and bearing at its other end against the under side of the platform, the said levers being so adjusted that they bear upward against the stud of the scoop with a power equal to the weight of the scoop. The scoop is provided with a base flange, projecting a little lower than the stud does, for a rest by which to set upright on the counter, which flange also serves, together with a rabbet of the platform, to facilitate the centering of the scoop on the platform for properly locating it when hastily placed thereon, all as hereinafter fully described.

Reference is to be had to the accompanying drawings, forming part of this specification, in which similar letters of reference indicate corresponding parts in both figures.

Figure 1:
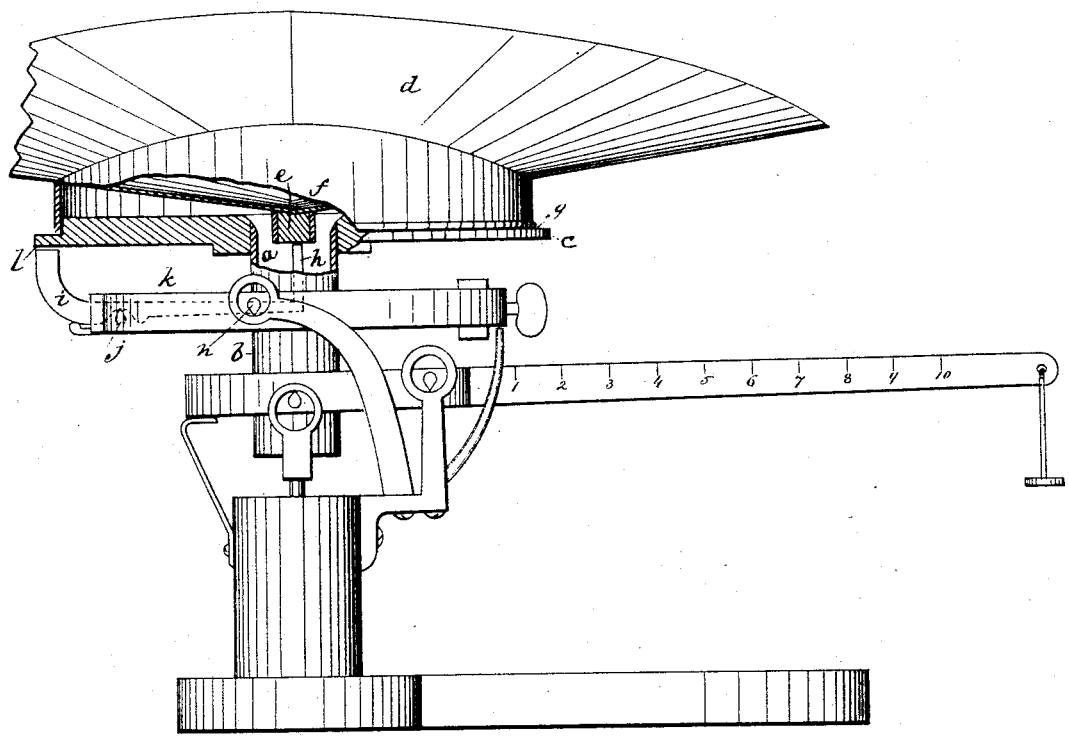
Figure 2:
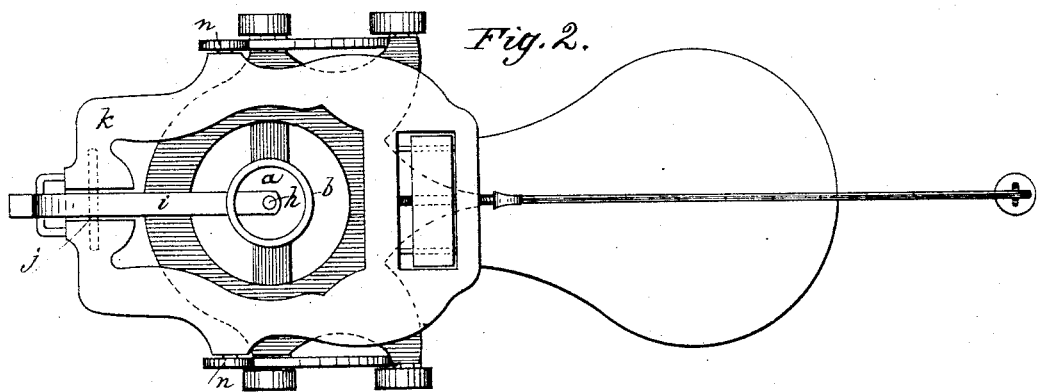

Figure 1 is a side elevation; Fig. 2, a plan view with the scoop removed.

I make a hollow space, $a$, in the upper part of the standard $b$, which opens up through the top of the platform $c$, on which the scoop $d$ is to be placed to be weighed, and provide the scoop with a stud, $e$, at the center of the bottom, projecting downward from the scoop into the said hollow space a little when the scoop rests on the platform, which I have arranged it to do by the flange $f$, which I attach to the bottom, and for which I provide a rabbet, $g$, on the margin of the platform, whereon the flange will be so guided to its place, when any part of the flange touches the rabbet, that the stud $e$ will come to its place in the recess without care or attention by the attendant. Within the recess $a$ the stud $e$ drops on the stud $h$ at one end of a lever, $i$, when the scoop comes to its rest, which lever has a fulcrum at $j$ on another lever, $k$, and it bears at its other end on the platform at $l$. This lever $k$, which is a kind of yoke extending both sides of the standard $b$, is supported by a pivot, $n$, for its fulcrum, and it is so adjusted that it presses stud $h$ up against the scoop with a power equal to the weight of the scoop. This arrangement is a simpler balancing contrivance than any heretofore made, and is therefore cheaper and more reliable.

Having thus described my invention, I claim as new and desire to secure by Letters Patent—

1. In a scoop-balance attachment for weighing-scales, the standard $b$, having a hollow space, $a$, in which a central stud, $e$, of the scoop has contact with the balancing-lever attachment when the scoop is on the scale, substantially as described.

2. The combination, in a scoop-balance attachment, of the balancing-lever $k$, pivoted to standard $b$, intermediate lever, $i$, pivoted to lever $k$, and the scoop $a$, having a stud, $e$, bearing on a stem of lever $i$, said lever $i$ bearing at its outer end against the under side of the platform, and extending into the hollow space $a$ of the standard for connection with the stud $l$, located at the center of the scoop, substantially as described.

3. The scoop $d$, having flange $f$ and center stud, $e$, in combination with the platform $c$, having rabbet $g$, and a hollow center space, $a$, in which stud $e$ has contact with the balancing-lever device, substantially as described.

ASA LEAS.

Witnesses:
C. T. BOWER,
J. WESLEY LEAS.